DETECTOR FOR VARIABLE SPEED FACSIMILE SYSTEM

Filed July 2, 1964 2 Sheets-Sheet 1

INVENTOR,
MAURICE ARTZT
BY Harry M. Saragovitz, Edward J. Kelly, Herbert Berl, & Julian C. Keppler
ATTORNEYS Sept. 2, 1969 M. ARTZT 3,465,096

DETECTOR FOR VARIABLE SPEED FACSIMILE SYSTEM

Filed July 2, 1964

2 Sheets-Sheet 2

INVENTOR,
MAURICE ARTZT

BY Harry M. Saragovitz
Edward J. Kelly, Herbert Berl
& Julian C. Keppler
ATTORNEYS United States Patent Office 3,465,096

Patented Sept. 2, 1969

3,465,096
DETECTOR FOR VARIABLE SPEED FACSIMILE SYSTEM

Maurice Artzt, Princeton, N.J., assignor to the United States of America as represented by the Secretary of the Army Filed July 2, 1964, Ser. No. 380,109
Int. Cl. H04n 3/28, 7/00
U.S. Cl. 178—6 11 Claims

ABSTRACT OF THE DISCLOSURE

A detector-timer network for use in a facsimile system in which variable-velocity scanning is used for half-tone reproduction and fast transmission speed. A timing capacitor is connected to a steady charging source and is periodically discharged by a narrow pulse produced by a pulse generating network. An amplifier associated with the timer capacitor is biased such that it conducts only after the timer capacitor has been charged to a predetermined level. The resultant timer pulses at the amplifier output have widths equal to a half cycle of the FM signal minus the time required for the capacitor to reach the predetermined level of charge. The resultant pulses control a sweep generator for the scanning network.

Figures 1, 3A, 3B, 3C, 3D, 3E, 3F, 3G, 3H:
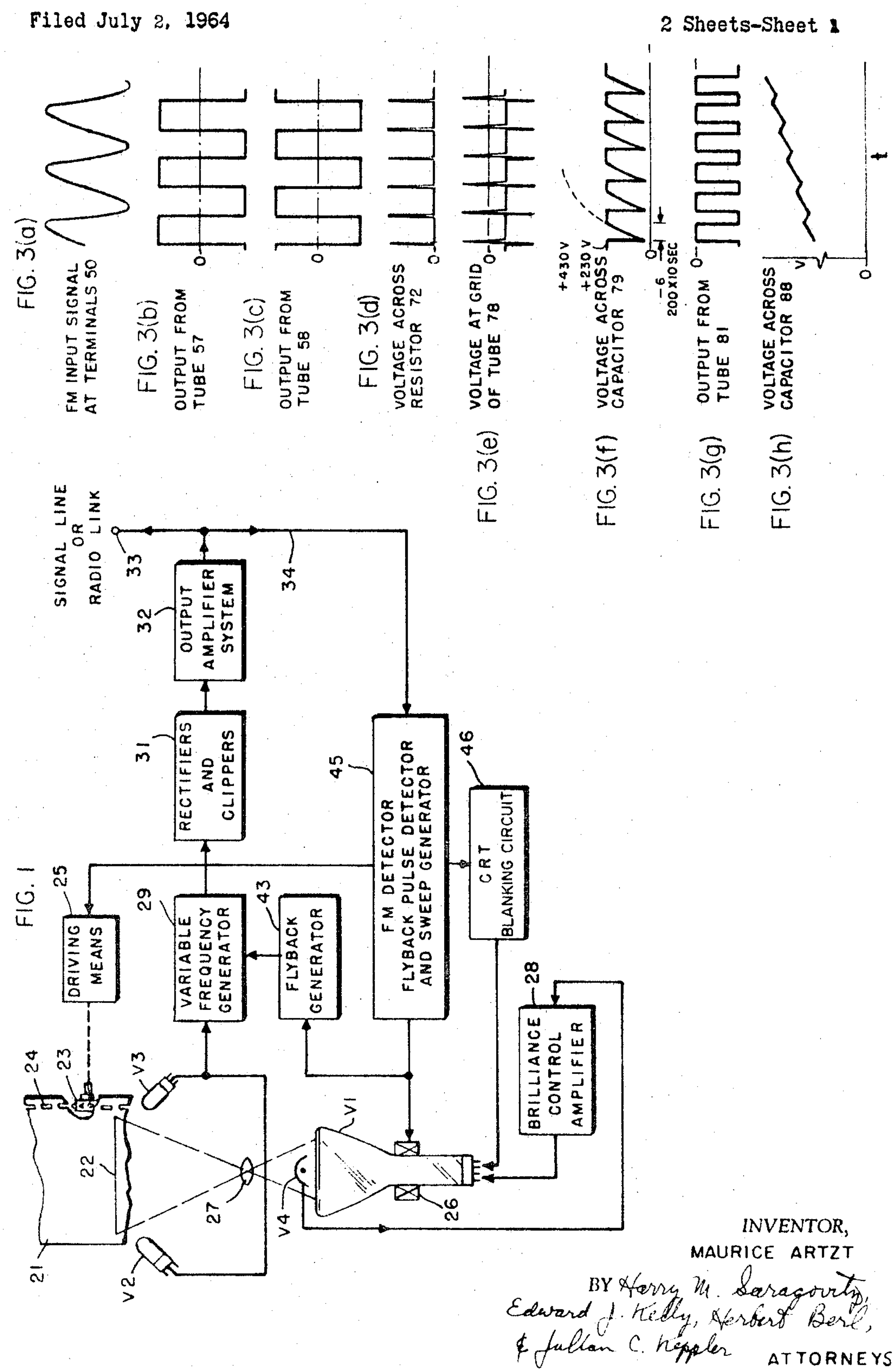

This invention relates to facsimile systems, and more particularly, to a detector for use in facsimile systems in which variable-velocity scanning is used to permit half-tone-reproduction along with increased speed of transmission.

Facsimile has long been considered as an inefficient means of communication. The bandwidth is many times that required for such systems as Teletype, and it is generally used mainly for its ability to transmit graphic or pictorial material. Part of the inefficiency is due to redundancy, in that 35 or 40 "picture elements" are required to form a readable letter as compared to the 5 unit code of Teletype. This 7 to 1 loss can hardly be eliminated without also eliminating the ability to transmit graphic material. However, a second loss is also present in that the waste area between bits of information is transmitted at the same area rate as the information area. This loss can be at least partially eliminated by what is known as variable-velocity scanning. Here the information areas would be transmitted at the normal rate and require a bandwidth equal to the normal facsimile system, whereas on waste or white areas the scanning rate would be increased to eliminate part of this wasted time.

One type of copy often transmitted is represented by drawings, weather maps and typewritten messages, which have the general characteristic that information is represented by black lines or marks on a white background (or the reverse). Analysis of this type of copy immediately eliminates practically all forms of coding the $x$ coordinate of a black picture element, for it has been found that the average typed message (close typed to eliminate waste area) and weather maps each have an average black area of about 10%.

The systems which do not use coding fall into four general classes:

(1) Two-speed systems in which only black and white are transmitted.

(2) "Black limit" systems in which all scanning is at the high speed or "white" rate, but the scanning spot is momentarily stopped to give a signal "entering black," and again momentarily stopped to give a signal "leaving black."

(3) Multispeed systems in which one or more shades of gray are transmitted at intermediate speeds between the black and white speeds.

(4) True variable velocity systems in which the speed of scanning varies linearly from a minimum for black through all the gray shades up to a maximum for white.

In the above classification the "black limit" system becomes the same as the two speed system (1) if each black signal is only one picture element long. As the statistical analysis of typing shows the average black area to only 1.5 elements long there would be very little speed gain in using (2) instead of (1). Regardless of which system classification is selected, such as (1) or (2) for example, it is evident that considerable saving in transmission time is possible if the waste areas are scanned at a higher rate. As this invention is primarily concerned with a variable-velocity scanning system wherein reasonable accurate reproduction of all shades of gray are possible as well as black and white, attention will be primarily directed to classification (4).

The true variable-velocity facsimile system (type 4), of all the classifications listed above, can best meet the requirements for reduced transmission time while retaining accurate half-tone rendition. Applicant's Patent No. 2,901,538, issued Aug. 25, 1959, relates to a variable-velocity facsimile system with particular emphasis on the use of a frequency-modulated carrier in which the frequency shift is sufficiently rapid to allow modulating signals to approach the carrier in actual frequency. Reference may be had to that patent for further discussion of the background and general characteristics of such systems Applicant's copending application, SN 261,241, filed on Feb. 26, 1963, now Patent No. 3,229,033, relates to a variable velocity facsimile system which overcame one of the limitations of prior FM systems, viz., that very little, if any, actual speed was gained over a conventional constant velocity system. The improvement described in the above mentioned application resulted in the transmission of an acceptable recording at an increased speed. An excellent half-tone scale was produced having almost acceptable synchronism. However, hum was in evidence, accounting for a relatively high percentage of synchronizing errors.

It is therefore an object of this invention to provide an improved detection circuit for a variable-velocity facsimile system to overcome the deficiencies of the prior art.

It is a further object of this invention to provide means for detecting the FM signal in a variable-velocity facsimile system which is far more stable than prior detectors.

It is a further object of this invention to provide an improved detector for a variable-velocity facsimile system which reduces hum and synchronizing errors.

Another object of this invention is to provide a detector for a variable-velocity facsimile system which results in considerable improvement in synchronizing, simplification of recorder alignment adjustments, and an improvement in recorded detail.

The new method of detecting the FM signal simplifies the recorder circuitry and is more stable than the "phase-shift" detector which is described in applicant's above mentioned application. With this new detector it is possible to have an infinite density range without disturbing synchronism. Thus, high contrast can be obtained for black and white copy or a linear half-tone scale for pictures.

A brief description of the operation of the improved detector will now be given. The sawtooth wave which represents the current in the horizontal coils of the cathode ray tube yoke is generated by charging a capacitor to a predetermined upper voltage limit. At this point a discharge circuit is triggered "on" and the capacitor is discharged to a predetermined lower value and held there until released at the end of the time set by the phase pulse timer. The charging of the capacitor is controlled by two circuits. One is an accurately regulated constant current. The second circuit is operated by a detector-timer pulse generator which generates pulses, the width of which are related to the frequency of the FM signal generated by the scanner. When the second circuit is turned on for the duration of the timer pulses, it draws discharge current sufficient to overcome the constant charging current and discharges the capacitor at a given rate. The net result of these two currents is the generation of a triangular voltage across the capacitor which increases during the greater portion of each half cycle of the FM signal, but which decreases for some portion of each half cycle depending on the black content of the signal. The spot generated on the CRT is thus moved backward for the duration of each timer pulse and forward for the time between pulses.

The heart of the detector-timer pulse generator is a timer capacitor which requires a predetermined time to charge from a lower level to a higher level. A limiter and pulse generating network generates a narrow pulse each time that the FM signal crosses the zero axis. This pulse discharges the timer capacitor from the higher level to the lower level. An amplifier associated with the timer capacitor is biased so that it conducts only when timer capacitor is charged to the higher level. The resultant timer pulses have widths equal to a half cycle of the FM signal minus the time required for the timer capacitor to charge between the lower and higher levels. These timer pulses turn on the second circuit to discharge the sweep generator capacitor as described above.

Figure 2:
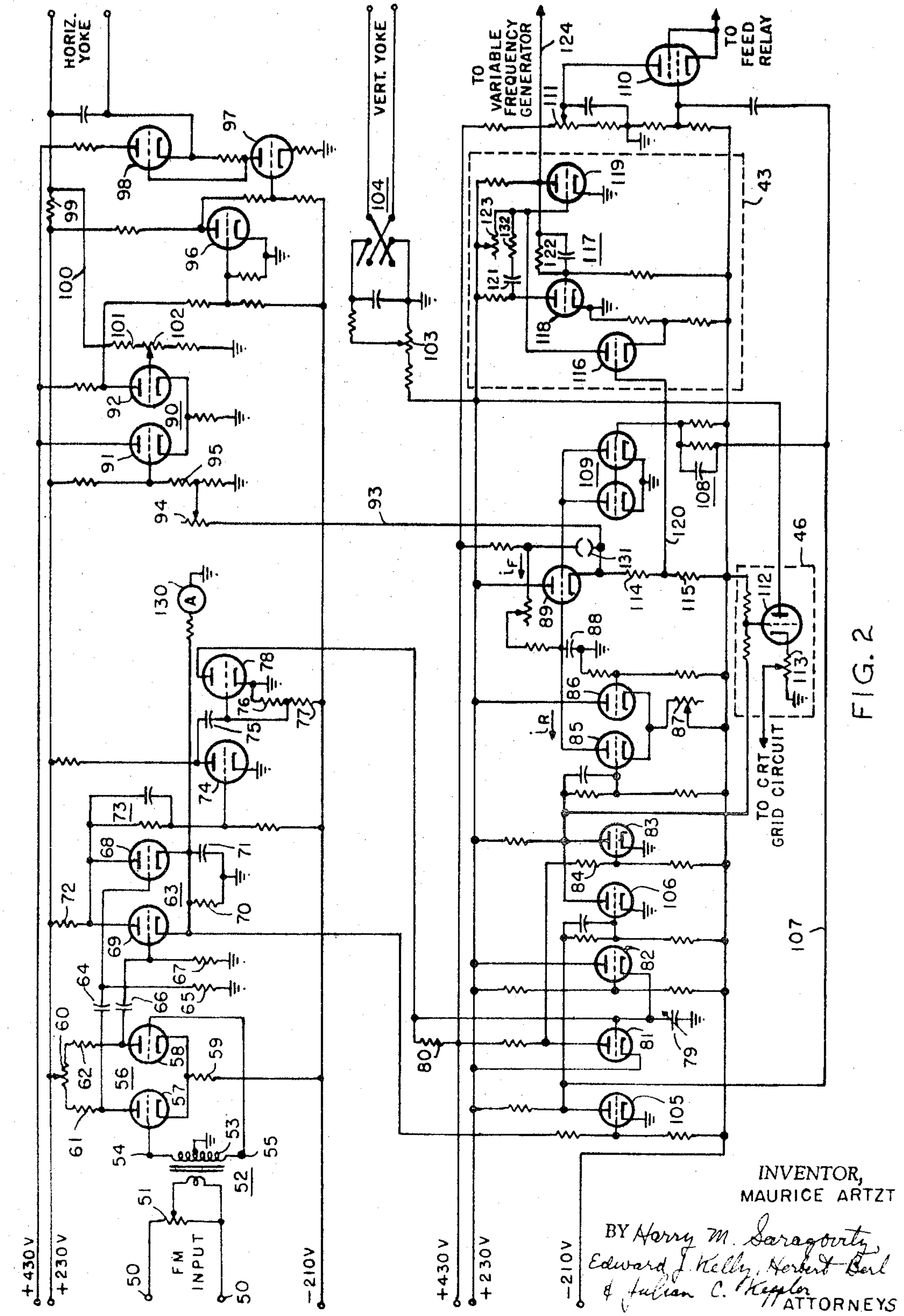

A more detailed description will now be given in connection with the accompanying drawings in which:

FIG. 1 represents a block diagram of a variable velocity facsimile system in accordance with this invention, FIG. 2 is a detailed circuit diagram of the improved detector and its associated circuitry, and FIGS. 3*a*–3*h* represent a series of waveforms which exist at various designated points in FIG. 2.

Referring to FIG. 1, the subject matter to be transmitted from the scanner to a recorder at a remote point is shown at 21 as being carried past a scanning zone 22 in the conventional manner by a belt or drum driven by sprocket 23 engaging holes 24 in the drum. Driving means 25, which may be a ratchet motor, for example, moves the drum synchronously with the scanning as will presently be explained.

The scanning area is illuminated by a flying-spot cathode-ray tube V1 which produces an intense spot of light on the face of the tube. Yoke coil 26 sweeps the spot into a line across the face of the tube; this line is projected through lens 27 onto scanning area 22. Light reflected from the scanned subject matter is picked-up by photocells V2 and V3, which may be conventional photomultipliers. These tubes, which are connected in parallel for signal output, are arranged near either end of the scanned line 22 to provide a relatively uniform electrical response to the illumination. Photocell V4 is mounted near the face of scanner tube V1 to sense its total light output. The signal from this tube is amplified by brilliance control amplifier 28 to provide control voltage at the grid of scanning tube V1 to maintain a uniform spot intensity.

The signal from phototubes V2 and V3 is amplified and changed into a frequency-modulated sawtooth wave by variable frequency sawtooth generator 29. This is coupled through rectifiers and clippers 31 and amplified by 32 for transmission by direct wire or radio from output 33. A portion of the output signal is tapped off at line 34 for controlling the sweep system. The FM signal on line 34 is detected at 45 and the information derived from the FM signal is used to control the sweep generator. The output from the sweep generator controls the current flowing through the horizontal yoke coil 26; it also actuates the flyback generator 43. The flyback generator, which is used only at the scanner, is connected to the generator 29 so that the FM signal ceases for the duration of the flyback pulse. Detector 45 detects the flyback pulse and controls the driving means 25. A CRT blanking circuit 46, which is used at the recorder only, is connected to the CRT grid circuit to turn off the spot during the flyback time.

FIG. 2 shows in detail the circuitry of the flyback generator 43, the CRT blanking circuit 46 and the FM detector, flyback pulse detector and sweep generator 45. The FM signal appearing on line 34 of FIG. 1 is applied to input terminals 50 of FIG. 2. Potentiometer 51 sets the signal level applied to a transformer 52. The secondary winding 53 is grounded at its center tap and has two terminals 54 and 55 which are connected to the grids of two tubes 57 and 58 of a trigger circuit 56. The cathodes of tubes 57 and 58 are connected to a common cathode resistor 59. A potentiometer 60 in the plate circuit of tubes 57 and 58 provides 180 degree balance. Tubes 57 and 58 alternately conduct in synchronism with the FM input signal to provide square wave outputs across plate resistors 61 and 62 which are out of phase with respect to each other. The FM signal is thus limited to form a sharp edged square wave since the zero crossings of the FM signal is the only information needed. The input signal represented in FIG. 3*a* is thus limited to form out of phase square waves shown in FIG. 3*b* and 3*c* which appear at the outputs of tubes 57 and 58 respectively.

The outputs from trigger circuit 56 are coupled to a summing circuit 63 by two differentiator networks comprising capacitors 64 and 66 and resistors 65 and 67. The differentiators provide positive and negative going spikes at the grids of tubes 68 and 69. For each half cycle of the input FM signal a negative voltage spike appears at the grid of one of these tubes and causes a positive voltage spike to appear in the output of summing circuit 63 across resistor 72. The output across resistor 72 which is shown in FIG. 3*d* contains a positive pulse for each point in time that the FM signal crosses the zero axis. The cathodes of tubes 68 and 69 are connected to a common cathode biasing network comprising a resistor 70 and a capacitor 71, across which the phase pulse is developed during each period during which the FM signal ceases. A microammeter 130 is connected to the cathodes of tubes 68 and 69 to indicate the proper adjustment of potentiometer 51.

The output from the summing circuit 63 is coupled through a parallel RC network 73 to an amplifier 74, the output of which is differentiated by a network comprising capacitor 75 and resistors 76 and 77. The resultant voltage waveform, which is shown in FIG. 3*e* is applied to the input of an amplifier 78.

A timer capacitor 79 is the basic element in a circuit which generates pulses, the widths of which are proportional to the information or black content of the recording. This capacitor is charged by a current which flows from the +430 v. line through resistor 80 and capacitor 79 to ground. In the particular example to be herein considered for purposes of explanation, the voltage across the capacitor, which is shown in FIG. 3*f*, rises from a fully discharged condition of about +10 v. to +230 v. in approximately 200 microseconds. When this voltage reaches +230 v., tube 81 conducts, and the voltage across capacitor 79 cannot exceed +230 v. since the cathode of tube 81 is directly connected to the +230 v. line. As shown in FIG. 3*f* the voltage across capacitor 79 remains at +230 v. until tube 78 discharges it to about +10 v. This occurs on each positive pulse of FIG. 3*e* at the start of each half cycle of the FM wave. When capacitor 79 discharges to about +10 v. tube 82 conducts and prevents the voltage from going any lower.

The dashed line curve in FIG. 3*f* represents the RC charge curve for resistor 80 and capacitor 79. This capacitor can be adjusted so that it charges from +10 v. to 230 v. in 200 microseconds.

Since tube 81 conducts only when the voltage across capacitor 79 is +230 v., its output which is shown in FIG. 3*g*, consists of negative going pulses, the widths of each being equal to one half the period of the FM wave minus 200 microseconds. The output of tube 81 is coupled to an amplifier 83 by a resistor 84.

The grid of a tube 85 is biased at −135 v. for the duration of the 200 microsecond "subtracted time" of each half cycle of the FM signal. The cathode of tube 85 and that of a tube 86 are connected to a variable cathode resistor 87. Since the cathodes of tubes 85 and 86 cannot go below −110 v., the grid bias of tube 86, tube 85 will be biased below cutoff during the 200 microsecond time intervals and $i_R$, the plate current of tube 85, will be zero.

For the remaining time in each half cycle of the FM signal, the grid of tube 85 is at −85 v., tube 86 will be cutoff, and tube 85 will draw a plate current $i_R$ which can be regulated by the variable resistor 87. The current $i_R$ is about 0.425 ma. in the particular example being described.

A storage capacitor 88 supplies the sweep or deflection voltage reference for the cathode ray tube horizontal sweep. This reference voltage is taken from a cathode follower 89. A regulator tube 131 furnishes a voltage reference so that a current $i_F$ may be continuously supplied to capacitor 88, tending to cause the voltage thereacross to rise at a fixed rate. The current $i_F$ is approximately 0.17 ma.

The net charge rate of capacitor 88 is therefore determined by $i_F$ for 200 microseconds out of each half cycle, and for the remaining time in each half cycle, $i_R$ is turned on and discharges capacitor 88 with a current $(i_R - i_F)$, which in this example is about 0.255 ma. When the signal is at 2400 c.p.s. (the frequency chosen for white) each half cycle is 208 microseconds long, and the net charging of capacitor 88 is $153 \times 10^{-6}$ coulombs per second. The voltage across capacitor 88 is thus increased at an average rate of 546 volts per second for white in increments of 0.1138 volt per half cycle of the FM signal. The average rate for black is 182 volts per second in increments of 0.0506 volt per half cycle of the FM signal. For white the voltage increases 0.1214 volt in 200 microseconds and decreases 0.0076 volt in 8.33 microseconds. For black the voltage increases 0.1214 volt in 200 microseconds and decreases 0.0708 volt in 77.78 microseconds. FIG. 3*h* shows a portion of the sawtooth waveform generated across capacitor 88.

With the slowest scanning rate (black) set at 90 lines per minute or ⅔ second per line, the voltage change across capacitor 88 will be about 121.3 volts for the full scanning sweep. A solid black 8 inch scanning line will be scanned in 2400 steps of approximately 0.00333 inch per step net advance. Each step will consist of a forward motion of 0.008 inch and a backward motion of 0.00467 inch. For a solid white scanning line, at 270 lines per minute, 1066.67 steps are made with a net advance of 0.0075 inch per step. These steps consist of a forward motion of 0.008 inch and a backward motion of 0.0005 inch.

The sweep voltage which is taken from cathode follower 89, is coupled to a tube 91 of a differential comparison amplifier 90 by way of line 93, a variable resistor 94 and a resistor 95. The output from the plate of the second tube 92 of the differential amplifier is coupled to an amplifier 96. The amplified signal appearing at the plate of tube 96 is coupled to the grid of a tube 97 of the yoke drive amplifier which comprises tubes 97 and 98 connected as a one over one balanced D.C. amplifier having a D.C. centerline of output connected to the yoke. Yoke current is measured by the voltage drop acros a resistor 99 which is connected in series with the yoke. This voltage drop is connected by way of line 100, resistor 101 and potentiometer 102 to the grid of tube 92 of the differential amplifier 90 which compares the yoke resistor current to the sweep voltage from cathode follower 89 and forces the yoke current to match this voltage at all points along the sweep. Potentiometer 102 provides the horizontal centering adjustment. Due to the high gain amplifier and driver stages within this feedback loop, the yoke current is sufficiently accurate to produce highest quality pictures.

The voltage which is applied to the vertical yoke coil may be adjusted by a network which comprises a potentiometer 103 and a double-pole double-throw switch 104.

As previously stated, the cathode output from tube 69 contains the negative going phase pulse. This is due to the fact that the phase pulse is transmitted as a cessation of the FM signal. When the FM signal ceases for the duration of the phase pulse, the voltage across the cathode biasing network comprising resistor 70 and capacitor 71 falls from some positive level to zero. The phase pulse is amplified by a tube 105. An output of tube 105 is coupled to a tube 106 which is caused to conduct for the duration of the phase pulse. Since the plate of tube 106 is connected to the grid of tube 85, tube 85 will be held in a nonconducting condition for the duration of the phase pulse.

A second output from amplifier 105 is coupled over a line 107 through a parallel RC coupling network 108 to a pair of parallel amplifiers 109. The plates of amplifiers 109 are connected to the grid of cathode follower 89 and therefore to the ungrounded terminal of capacitor 88. The positive phase pulse on line 107 causes amplifiers 109 to conduct and therefore discharge capacitor 88.

Line 107 is also connected to a tetrode 110 which supplies power to the feed relay (driving means 25 of FIG. 1). A potentiometer 111 in the plate circuit of tetrode 110 permits adjustment of the feed relay power. The cathode of tetrode 110 is directly connected to the feed relay (not shown). Each time that the positive phase pulse appears on line 107, tetrode 110 conducts and the feed relay is energized.

The negative phase pulse which appears at the plate of tube 106 is coupled to the CRT blanking circuit 46 which comprises a cathode follower 112. A potentiometer 113 forms the cathode follower load. A negative pulse is taken from the tap of the potentiometer and is coupled to the CRT grid circuit to cut off the electron beam for the duration of the phase pulse.

The heart of the phase pulse generator which is enclosed by dashed lines 43 is a monostable multivibrator 117 which comprises two tubes 118 and 119. The plate of tube 118 is coupled to the grid of tube 119 by a resistor 132 and a capacitor 121 which are connected in series. A parallel RC network 122 connects the plate of tube 119 to the grid of tube 118. A variable resistor 123 which is connected between the grid of tube 119 and the +230 v. supply permits adjustment of the phase pulse time. The phase pulse generator is triggered by the voltage appearing at the junction of resistors 114 and 115 which are located in the load circuit of cathode follower 89. This voltage is coupled across a line 120 to an amplifier 116, the output of which is connected to the grid of tube 119. When the voltage across capacitor 88 reaches a predetermined value it causes the multivibrator 117 to be triggered since it is coupled to the multivibrator by the cathode follower 89 and the amplifier 116. The phase pulse which appears at the plate of tube 119 is coupled across a line 124 to the variable frequency generator which is shown in FIG. 1.

What is claimed is:

1. In a variable velocity facsimile system using a frequency modulated signal for the transmission of information, a detector comprising: pulse timer means for producing timer pulses, the widths of which are equal to one half the period of the frequency modulated signal minus a constant amount; capacitor means for generating a sweep voltage for a cathode ray tube; means for continually charging said capacitor means at a predetermined rate; and means responsive to said timer pulses for discharging said capacitor means for the duration of said timer pulses; and flyback generator means connected to said capacitor means and responsive to the voltage thereacross for generating a pulse when the voltage reaches a predetermined value.

2. The detector as set forth in claim 1 which further comprises differential comparison amplifier means connected between said capacitor and said cathode ray tube for comparing the current supplied to the deflection circuit of said tube to the voltage across said capacitor and forcing said current to be proportional to said voltage at all points along the sweep.

3. The detector as set forth in claim 1 which further comprises means responsive to the cessation of the frequency modulated signal for detecting a flyback pulse; and means coupled to said flyback pulse detecting means for blanking said cathode ray tube for the duration of the flyback pulse.

4. The detector as set forth in claim 3 which further comprises means coupled to said flyback pulse detecting means for discharging said capacitor means during each flyback pulse.

5. In a variable velocity facsimile system using a frequency modulated signal for the transmission of information, a detector comprising: first pulse generating means for producing a pulse each time the FM signal crosses the zero axis; capacitor means responsive to a constant voltage source for maintaining a charging potential thereacross, said capacitor means providing a voltage signal which varies from a minimum value to a maximum value in a predetermined time, said capacitor means being discharged by the pulses from said pulse producing means; first amplifier means connected to said capacitor means and conducting during the time that the voltage across said capacitor means is at its maximum value for producing timing pulses, the widths of which are equal to the time between pulses from said first pulse producing means minus said predetermined time; a capacitor; means connected to said capacitor for continually charging it at constant rate; second amplifier means connected to said capacitor and being driven to conduction for the duration of said timing pulses for discharging said capacitor while said second amplifier means is conducting; a cathode ray tube; and means for connecting the voltage across said capacitor to the horizontal yoke of said cathode ray tube.

6. The detector as set forth in claim 5 in which said first pulse producing means comprises a trigger circuit having two input terminals and two output terminals for providing two outputs which are out of phase with respect to each other; means for applying the frequency modulated signal to said two input terminals so that the signal at one terminal is out of phase with respect to that at the other terminal; means connected to said trigger circuit for differentiating each of said outputs; and a summing circuit connected to said differentiating means.

7. The detector as set forth in claim 5 which further comprises flyback generator means connected to said capacitor and responsive to the voltage thereacross for generating a pulse when the voltage reaches a predetermined value.

8. The detector as set forth in claim 7 which further comprises differential comparison amplifier means connected between said capacitor and said cathode ray tube for comparing the current supplied to the deflection circuit of said tube to the voltage across said capacitor and forcing said current to be proportional to said voltage at all points along the sweep.

9. The detector as set forth in claim 7 which further comprises means responsive to the cessation of the frequency modulated signal for detecting a flyback pulse; and means coupled to said flyback pulse detecting means for blanking said cathode ray tube for the duration of said flyback pulse.

10. In a variable velocity facsimile system using a frequency modulated signal for the transmission of information, a detector comprising: transformer means having two terminals at which the frequency modulated signal appears as out of phase signals; trigger means having two input terminals respectively connected to said transformer terminals and having two output terminals at which out of phase square waves appear that are in synchronism with the frequency modulated signal; a differentiating network connected to each of said trigger output terminals; means for summing the pulses produced by said differentiating networks and thereby producing a pulse each time the frequency modulated signal crosses the zero axis; capacitor means responsive to a constant voltage source for maintaining a charging potential thereacross, said capacitor means providing a voltage signal which varies from a minimum value to a maximum value in a predetermined time, said capacitor means being discharged by the pulses from said summing means; first amplifier means connected to said capacitor means and conducting during the time that the voltage across said capacitor means is at its maximum value for producing a timing pulse the width of which is equal to the time between pulses from said summing circuit minus said predetermined time; a capacitor; means connected to said capacitor for continually charging it at a constant rate; second amplifier means connected to said capacitor and being driven to conduction for the duration of said timing pulses for discharging said capacitor while said second amplifier means is conducting; a cathode ray tube; and means for connecting the voltage across said capacitor to the horizontal yoke of said cathode ray tube.

11. The detector as set forth in claim 10 in which said summing means comprises two amplifiers each having input, output and common terminals, said input terminals being respectively connected to said differentiating networks, said output terminals being connected together, and said common terminals being connected to a filter impedance across which a flyback pulse is detected.

References Cited

UNITED STATES PATENTS

| | | | |
|---|---|---|---|
| 2,412,064 | 12/1946 | Moe | 315—29 |
| 2,419,118 | 4/1947 | Christaldi | 315—29 |
| 2,662,981 | 12/1953 | Segerstrom | 315—29 |
| 3,031,583 | 4/1962 | Murphy | 328—183 |
| 3,105,168 | 9/1963 | Clark | 315—29 |

ROBERT L. GRIFFIN, Primary Examiner

JOSEPH A. ORSINO, Jr., Assistant Examiner

U.S. Cl. X.R.

315—29; 328—183; 178—7.2